Figure 1:
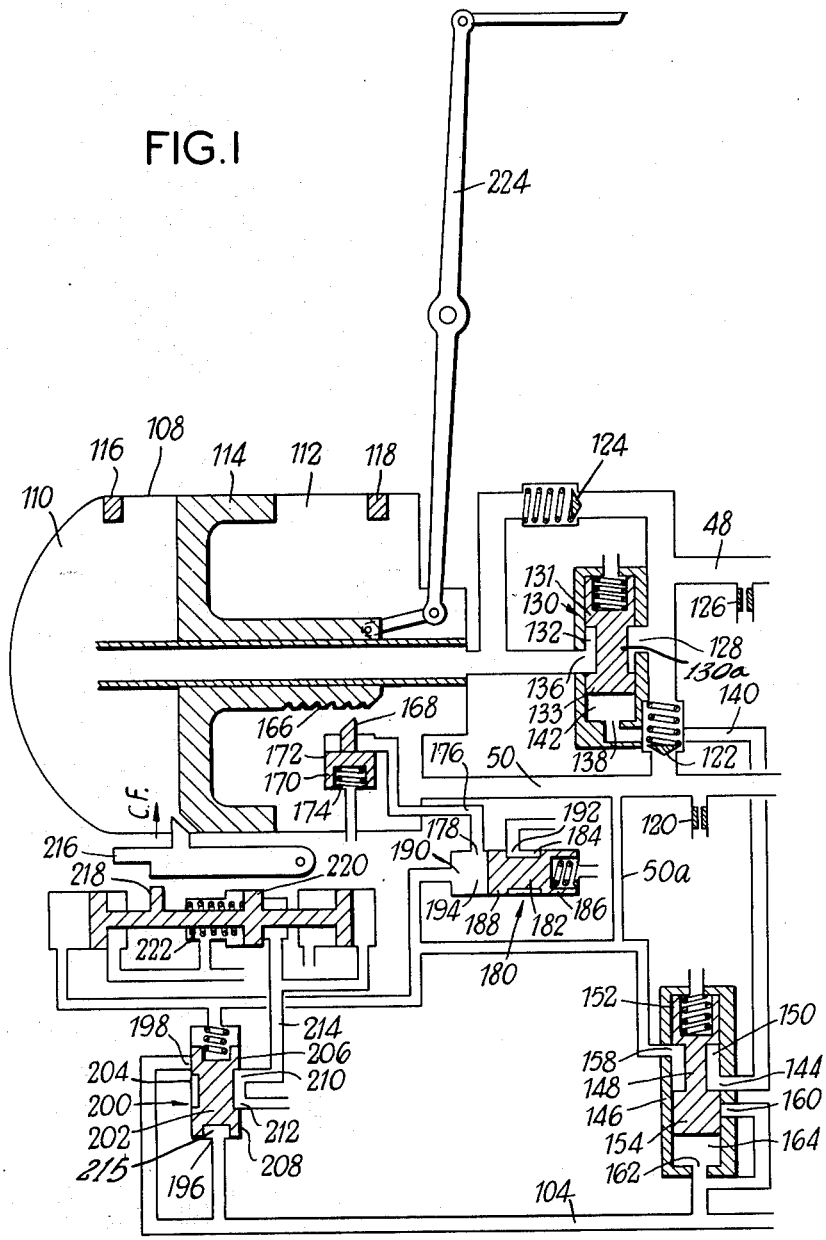

Sept. 21, 1965   P. W. TIMEWELL   3,207,227
VARIABLE PITCH PROPELLER CONTROL SYSTEM
Filed Aug. 7, 1962   2 Sheets-Sheet 1

Inventor
Peter Wallace Timewell
By Karl W. Flocks
Attorney

United States Patent Office 3,207,227
Patented Sept. 21, 1965

3,207,227
VARIABLE PITCH PROPELLER CONTROL SYSTEM
Peter Wallace Timewell, Kenton, England, assignor to The De Havilland Aircraft Company Limited, Hatfield, England, a company of Great Britain
Filed Aug. 7, 1962, Ser. No. 215,412
Claims priority, application Great Britain, Aug. 12, 1961, 29,199/61
13 Claims. (Cl. 170—160.2)

This invention relates to selectable pitch systems for the control of variable pitch propellers having an operating range in which the pitch angle of the propeller blades is selectable.

In such a selectable pitch system, the pitch angle of the blades is commonly controlled by a piston in a piston and cylinder arrangement in which liquid under pressure is selectively supplied to one or other side of the piston to displace the piston which is operatively connected to means responsive to the piston position to control the pitch angle of the propeller blades. The liquid under pressure is supplied to the cylinder through an increase pitch line or a decrease pitch line opening to the cylinder on opposite sides of the piston and the liquid is selectively supplied to one or other of these lines in accordance with existing requirements under the control of a hydraulic control valve. During normal flight, the pitch angle of the propeller blades is normally controlled as a function of engine speed (this condition being conveniently referred to as "r.p.m. governing") and stop means is provided to limit the displacement of the piston in one direction to define the lowest pitch angle acceptable under r.p.m. governing conditions. When the aircraft is not in flight, the stop means is either inoperative or can be made inoperative to permit the pitch angle of the propeller blades to be adjustable in a range of angles below the lowest angle defined by the stop means (which range may extend to negative pitch angles), for the purpose of facilitating the manoeuvering of the aircraft on the ground. This range of angles below that defined by the stop means is frequently referred to as the "Beta range."

With the advent of aircraft such as, for example, the rotorcraft, having both forward thrust propellers and separate independent means such as, for example, helicopter blades, operable to cause the aircraft to assume helicopter characteristics, there exists a requirement for a system whereby the pitch angle of the forward thrust propellers can be adjusted in the Beta range while the aircraft is in flight, particularly while the aircraft is in the helicopter condition, this usually being during take-off and landing. It is highly desirable, if not essential, that the selectable pitch system should incorporate a safety-factor which prevents the pitch angle of the forward thrust propellers departing from a selected value in the Beta range by more than a predetermined small amount in the sense of increasing the difference between the pitch angle defined by the stop means and that selected in the Beta range. Such a condition is conceivable in the event of a fault developing and could, for example on a twin engined aircraft, cause the aircraft to spin on its axis while in the helicopter condition with fatal results.

It is an object of the present invention to provide an improved selectable pitch system for the control of variable pitch propellers whereby the pitch angle of the propeller blades shall be adjustable in the Beta range during flight conditions and which shall incorporate the safety factor referred to above.

According to the present invention, a selectable pitch system for the control of a variable pitch propeller comprises a piston displaceable in a cylinder and operatively connected to control, by the position of the piston, the pitch angle of the propeller, a decrease pitch line communicating with the cylinder on one side of the piston for the supply of liquid thereto to displace the piston in one direction in the sense to decrease the propeller pitch, an increase pitch line communicating with the cylinder on the other side of the piston for the supply of liquid under pressure to displace the piston in the direction opposite to said one direction to increase the propeller pitch, stop means limiting displacement of the piston in said one direction, means for rendering said stop means inoperative, a hydraulic pitch lock valve in the increase pitch line and operable to disconnect the increase pitch line from the cylinder, a servo valve operable to open and close said pitch lock valve and means operable when said stop means is inoperative and said piston is displaced in said one direction beyond the limiting position defined by said stop means to respond to the departure of the piston position in said one direction from a selected position by an amount exceeding a predetermined value to operate said servo valve in the sense to close said pitch lock valve and prevent further displacement of the piston in said one direction.

Figure 2:
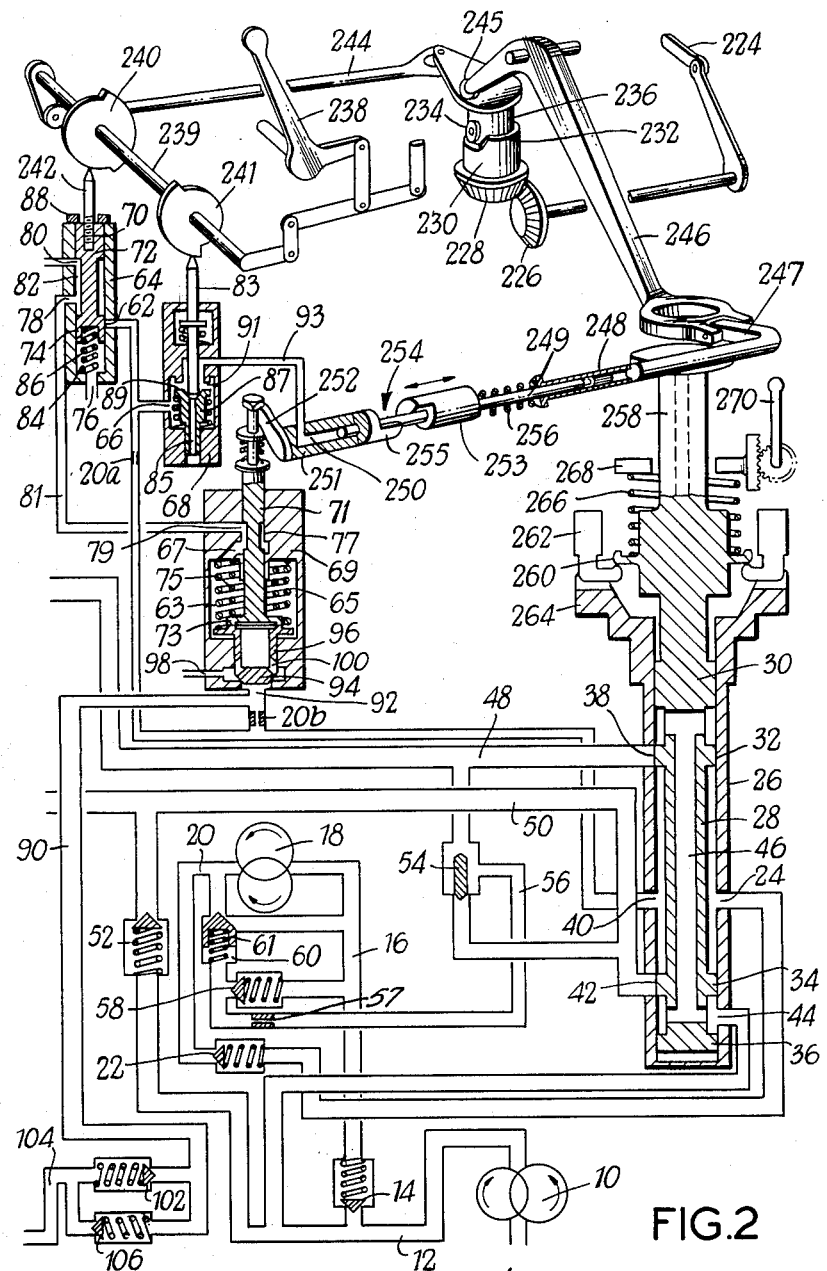

In order that the invention may be more clearly understood, one embodiment of the invention will now be described by way of example, reference being made to the accompanying drawings, in which:

FIGURES 1 and 2, taken together, form a hydraulic circuit diagram of a propeller selectable pitch control system according to the invention.

The system of this example is intended for the control of the forward thrust propellers of a rotorcraft and is shown in the drawings in the condition for r.p.m. governing.

An engine-driven pump 10 (FIGURE 2) operates to deliver liquid at a low pressure of about fifty pounds per square inch to a supply line 12 connected through a non-return valve 14 to a pump supply line 16. A propeller-driven pump 18 draws liquid from the line 16 and delivers it at a high pressure of, say, seven hundred pounds per square inch to a delivery line 20 containing a non-return valve 22. The line 20 leads to a central port 24 of a main control valve 26.

The valve 26 comprises a valve member 28 having four lands 30, 32, 34 and 36 and slidable in a bore having five ports 38, 40, 24, 42 and 44. A central bore 46 in the member 26 with connected side bores affords communication between the groove between the lands 30 and 32 and the groove between the lands 34 and 36. The port 38 is controlled by the land 32; the ports 40 and 24 communicate with the annular space between the lands 32 and 34; the port 42 is controlled by the land 34; and the port 44 is connected to the supply line 12.

The ports 38 and 42 are connected to an increase pitch line 48 and a decrease pitch line 50, respectively. The line 50 is connected through a relief valve 52 to the line 12. The lines 48 and 50 are connected to opposite sides, respectively, of a shuttle valve 54 having an outlet line 56. The shuttle valve 54 operates to connect to the line 56 whichever of the lines 48 and 50 has the higher pressure. The line 56 is connected through a restrictor 57 and a pressure limiter valve 58 to the line 16. The valve 58 is set to open at pressure of about nine hundred and ten pounds per square inch pressure, thus limiting the pressure in whichever of the lines 48 and 50 has the higher pressure. The line 56 also leads to a chamber 60 behind the piston of a spring-urged main relief valve 61 between the line 20 and the line 16. The pressure of the spring is equivalent to about one hundred and fifty pounds per square inch pressure on the piston of the valve 61, so that the liquid delivered by the pump 18 in the line 20 is under a pressure of one hundred and fifty pounds per square inch pressure higher than that in the higher of the lines 48 and 50. Thus a limiting valve of the pressure drop across the valve 58 is established. The valve 58 is of small capacity and does not normally need to allow a large flow to limit the pressure in the line 56. At its maximum flow of seventy gallons per hour, the restrictor 57 drops the pressure by one hundred and fifty pounds per square inch and thus reduces the pressure in line 20. This reduces the pressure in the lines 48 and 50 and the flow through the valve 58.

The line 20 is also connected, via the port 40, through a restrictor 20a to a port 62 of a stop withdrawal valve 64 and to a port 66 of a clutch operating valve 68. The valve 64 comprises a valve member 70 having two lands 72 and 74 and slidable in a bore having four ports 76, 62, 78 and 80. The port 78 communicates with the space 82 between the lands 72 and 74 and the port 76, which is an exhaust port, leads to a chamber 84 containing a spring 86 acting on the valve member 70. The valve member 70 has two positions in one of which (FIGURE 2) it is raised by the spring 86 against a stop 88 so that the land 74 closes the port 62, and the port 80, which is an exhaust port, communicates with the space 82 and the port 78, and in the other of which the port 80 is closed by the land 72 and the port 62 opens into the space 82 and communicates with the port 78.

The line 20 is also connected, via the port 40, through a second restrictor 20b to a line 90 and to a chamber 92 behind the piston 94 of a pressure setting relief valve 96 between the line 90 and an exhaust port 98. The piston 94 is hollow and its interior communicates with the exhaust port 98 by radial holes 100. The piston 94 is slidable in a bore of greater diameter than the chamber 92 and is subject to the pressure of a spring 63 located in a chamber 65. The chamber 65 is connected to a port 67 of a valve 69. The valve 69 includes a movable valve member 71 slidable in a bore of small diameter and having a head 73 located in the chamber 65 and seated upon an aperture leading to the hollow interior of the piston 94. The member 71 is subject to the pressure of a spring 75 in the chamber 65 so that the piston 94 is subject to the pressure of both springs and can also be subjected to the pressure in the chamber 65 acting on the differential areas of the bores. The stem of the member 71 is grooved so as to form an annular space 77 which communicates with a port 79 connected by a line 81 to the port 78 and which also, in the position of r.p.m. governing illustrated, communicates with the port 67. The member 71 is movable upwardly against its spring to remove the effect of the spring 75 from the piston 94 and to connect the chamber 65 to the exhaust port 98 and also to close the port 67.

The valve 68 includes a cam-controlled spring-pressed plunger member 83 whose end acts as a closure to a central bore 85 in a slidable spring-pressed valve member 87. The central bore 85 leads to exhaust and the member 87 is located in a chamber 89 to which the port 66 opens. Surrounding the end of the bore 85 engageable by the member 83 is a valve seat which can seat upon an annular shoulder 91 in the chamber 89 to divide off the chamber from a line 93. The shoulder 91 acts as a stop and the member 83 is movable away from the member 87 to open the line 93 to the central bore 85.

The line 90 is connected through a non-return valve 102 to a stop withdrawal control line 104, which is separated from drain by a light relief valve 106 backed up by pressure in the line 90.

The propeller (not shown) has a dome or cylinder 108 (FIGURE 1) divided into increase and decrease pitch chambers 110 and 112 by a piston 114 slidable axially in the cylinder between fixed stops 116 and 118. The piston 114 is connected to the blades of the propeller to vary the pitch thereof upon axial movement, for example in the manner described in the British patent specification No. 590,913. The decrease pitch line 50 is connected to the chamber 112, has a bleed 120 to drain and is connected through a relief valve 122 to the increase pitch line 48. The increase pitch line 48 is connected through a non-return valve 124 to the chamber 110, has a bleed 126 to drain and is connected to a port 128 of a hydraulic pitch lock valve 130.

The valve 130 comprises a valve member 130a having an annular space 132 between two lands 131 and 133 and is slidable in a bore having three ports 128, 136 and 138. The port 128 is connected to the increase pitch line 48; the port 136 is connected to the chamber 110; and the port 138 is connected to a line 140. The valve member is spring urged to a position in which the land 131 closes the port 128 and liquid in the chamber 110 is trapped in the annular space 132, but is movable (by liquid under pressure in the line 140 connected through the port 138 to a chamber 142 below the land 133) to a position in which both the ports 128 and 136 open into the space 132 and are thereby connected to by-pass the valve 124.

The line 140 is conneced to a port 144 of an hydraulic pitch lock servo-valve 146. The valve 146 comprises a valve member 148 having an annular space 150 between two lands 152 and 154 and slidable in a bore having four ports 158, 144, 160 and 162.

The ports 158 is controlled by the land 152 and connected to the decrease pitch line 50; the port 160 is controlled by the land 154 and connected to the line 104; and the port 162 leads from the line 104 to a chamber 164 below the land 154. The valve member 148 is spring urged to a position in which the port 158 is closed and the ports 14 and 160 connected to the space 150, but is movable by pressure in the chamber 164 to a position in which the port 160 is closed and the ports 158 and 144 connected to the space 150.

The propeller also has a mechanical pitch lock for the blades which is diagrammatically indicated by ratchet teeth 166 on the piston 114, which are engageable by a tooth 168 on a piston 170 slidable in a cylinder 172 and urged by a spring 174 to engage the tooth 168 in the ratchet teeth 166. The piston 170 is movable against the pressure of the spring 174 by liquid under pressure in the cylinder 172 which is connected to a line 176.

The line 176 is connected to a port 178 of a mechanical pitch lock servo-valve 180 which comprises a valve member 182 having an annular space 184 between two lands 186 and 188 and slidable in a bore having three ports 190, 178 and 192. The port 190 leads from a chamber 194 at one end of the valve to the decrease pitch line 50; the port 178 is controlled by the land 188; and the port 192 is an exhaust port to drain and is connected to the space 184. The valve member 182 is spring urged to a position in which the port 178 is connected to the space 184 and thus to the exhaust port 192, but is movable by liquid under pressure in the chamber 194 to a position in which the port 178 opens into the chamber 194.

The line 104 also leads to two ports 196 and 198 of a stop withdrawal servo valve 200. The valve 200 comprises a valve member 202 having an annular space 204 between two lands 206 and 208 and is slidable in a bore having four ports 198, 210, 212 and 196. The port 198 is controlled by the land 206; the port 210 opens into the space 204 and is connected to a line 214; the port 212 is controlled by the land 208 and is an exhaust port to drain; and the port 196 opens into a chamber 215 below the land 208. The valve member 202 is urged by a spring to a position in which the port 198 is closed and the ports 210 and 212 interconnected, but is movable by liquid under pressure in the chamber 215 to a position in which the port 212 is closed and the ports 198 and 210 are connected.

The propeller also has a set of pivoted withdrawal stops of which one stop 216 is shown diagrammatically. These stops are urged by centrifugal force CF during propeller rotation out of the path of movement of the piston 114 but are mechanically prevented from withdrawal by a finger 218 on a movable piston 220. The piston 220 is subject to opposed pressures from the decrease pitch line 50, and the line 214, and a spring 222. Liquid under pressure in the line 214 moves the piston against pressure in the line 50 and the spring 222 to permit withdrawal of the stop 216 and allow movement of the piston 114 beyond the stop position. Otherwise the piston 220 is held in a position to prevent withdrawal of the stop 216. In this position, overload on the stop 216 is prevented by the relief valve 122 between the increase and decrease pitch lines.

The piston 114 is connected by a blade angle feedback linkage 224 (diagrammatically indicated in FIGURES 1 and 2) to a bevel gear 226 (FIGURE 2) which rotates in correspondence with the actual pitch angle of the blade. The bevel gear 226 drives another bevel gear 228 on a sleeve 230 having a cam surface 232 on which runs a roller 234. The roller 234 is carried by a member 236 which is rotatable by a manually operable blade angle selector lever 238. The lever 238 is angularly movable between positions corresponding to blade pitch angles of +50° and −11°, and is connected to rotate a shaft 239 carrying a cam 240 and a cam 241. The shaft 239 is connected to the member 236 by a link 244. The cam 240 has a surface engaged by an extension 242 of the valve member 70 of the stop withdrawal valve 64. The cam 240 is such that upon selection of a blade pitch angle in the Beta range, i.e. below that angle set by engagement of the piston 114 and the withdrawable stop 216 (which angle may be +23°), the valve 64 is operated to connect the ports 62 and 78 and to close the port 80. This operation takes place as the lever 238 is moved through the +23° position, and the valve 64 remains in this state for all positions of the lever below +23°.

The cam 241 has a surface engaged by the plunger member 83. The cam 241 is such that upon selection of a blade pitch angle in the Beta range the plunger member 83 rises, allowing the valve member 87 to rise and cut off the port 66 from the line 93. Subsequently the plunger member 83 moves away from the valve member 87 and connects the line 93 through the bore 85 to exhaust. This movement takes place as the lever 238 is moved through the +23° position, and the valve member 87 and plunger member 83 remain in these positions for all positions of the lever below +23°.

The member 236 constitutes a blade angle follow-up device and is ifted and lowered by the roller 234 running on the cam surface 232 in accordance with the difference between the actual and selected blade pitch angles.

The member 236 is engaged by a roller 245 at one end of a pivoted lever 246 whose other end is connected to a lever arm 247 on the end of a tubular member 248 rockable about its axis.

Slidably splined within the other end of the member 248 is a rod 249. The rod 249 is also slidable in a chamber 250 in a rockable member 251 connected by a lever arm 252 to the valve member 71. The chamber 250 is connected to the line 93. The rod 249 carries one member 253 of a clutch 254, whose other member is constituted by a shaped portion 255 of the member 251. A spring 256 acts between the member 253 and a spring seat on the member 248 to tend to urge the rod 249 into the chamber 250 and the clutch 254 into engagement.

With the lever 238 in a position below +23°, i.e. in the Beta range, the valve 68 is operated upon the movement of the cam 241, to exhaust the chamber 250 to allow the clutch members 253 and 255 to move into drive transmitting engagement under the influence of the spring 256. Upon the occurrence of a predetermined negative difference (which may be 3°) between the selected and actual blade pitch angles in the Beta range, the member 236 is moved sufficiently to cause rocking of the member 248 to lift the valve member 71 against the spring 75.

The end of the pivoted lever 246 connected to the member 248 lies above and is adapted to engage in certain circumstances the stem 258 of the main control valve member 28. The stem 258 has an external flange 260 engaged by the toes of pivoted centrifugal weights 262 carried by a propeller-driven mounting 264. The flange 260 also acts as a lower spring seat for a spring 266 whose upper seat 268 is in the form of a ring the height of which is adjustable by a speed selector lever 270.

It will be understood that the levers 238 and 270 may be combined into a single lever with two cam surfaces, which causes no speed adjustment of the ring-like seat 268 during movement in the Beta control range represented by the lever 238 (+23° to −11°) and no blade angle adjustment of the member 236 during movement in the speed or r.p.m. governing range represented by the lever 270 (+50° to +23°).

In the Beta control range, the speed selector lever 270 and thus the spring 266 are set to a speed well below that of the member 264 so that the weights 262 hold the stem 258 in contact with the lever 246. In the speed or r.p.m. governing range, the level of the member 236 is such that the lever 246 is clear of the stem 258 and the position of the valve 28 is controlled by the action of the fly weights 262 against the spring 266.

*Operation*

The pressure setting relief valve 96 is designed to function so as to provide one of three pressures or ranges of pressure in the line 90 and hence in the line 104. These pressures are hereinafter referred to as the "low," "intermediate" and "high" pressures.

With the low pressure in the line 104, the valve member 202 of the stop withdrawal valve 200 is in the downward position illustrated and the valve member 148 of the hydraulic pitch lock servo valve 146 is urged down under the influence of the associated spring so that the low pressure in the line 104 passes also to the line 140 and hence causes the valve member 130a of the pitch lock valve 130 to be urged downwards by its spring to isolate the increase pitch line 48 from the increase pitch chamber 110 (other than through the non-return valve 124) and thereby preventing liquid escaping from the increase pitch chamber 110 to the increase pitch line 48 and preventing movement of the piston 114 in the sense to reduce the pitch of the propeller blades.

With the intermediate pressure in the lines 90 and 104, the valve members 202, 148 and 130a assume the positions illustrated in which the increase pitch chamber 110 is connected to the increase pitch line 48 through the pitch lock valve 130 and the propeller pitch can be increased or decreased as desired. The piston 220 and finger 218 prevent withdrawal of the stops 216.

With the high pressure in the lines 90 and 104, the valve members 148 and 130a assume the positions illustrated so that the propeller pitch can be increased or decreased as desired, but the valve member 202 of the stop withdrawal valve 200 is raised against the spring pressure to move the piston 220 and withdraw the stop 218 and allowing the piston 114 to be displaced past the stops 216 into the Beta range.

Under normal r.p.m. governing conditions with the forward thrust propellers operative to propel the aircraft, the lever 238 is in a position representing a pitch angle in the range of +50° to +23°, the lever 270 is set to a selected engine speed and the propellers are driven by the engine. The cams 240 and 241 which follow the movement of the lever 238 are in the positions illustrated in which the valve member 70 is displaced upwardly by its spring 86, closing the port 62 and opening the line 81 to exhaust, and the valve member 83 is depressed to expose the chamber 250 of the clutch 254 to the pressure in the line 20 and disengage the clutch members 253 and 255. With the line 81 open to exhaust, the chamber 65 of the pressure setting relief valve 96 is similarly open to exhaust and the valve piston 94 is exposed only to the pressure of the springs 63 and 75 which are so adjusted that, under this condition, some liquid leak occurs past the piston 94 to exhaust through the port 98 and the pressure of the liquid in the chamber 92 and lines 90 and 104 has the intermediate value, e.g. 150 p.s.i. With this intermediate pressure in the line 104, the stops 216 remain operative to limit the displacement of the piston 114 and the increase pitch chamber remains in communication with the increase pitch line 48.

The pump 18 delivers liquid to the line 20 under a pressure of eight hundred pounds per square inch, and to the lines 48 and 50 at six hundred and fifty and three hundred pounds per square inch, respectively, the apertures of the bleeds 126 and 120 (FIGURE 1) being chosen to this end, and the pressure in the line 50 being further limited by the valve 52.

With a propeller overspeed, the pressure in line 50 may fall to fifty pounds per square inch, the pressure in line 48 may rise to one thousand and sixty pounds per square inch and the pressure in line 20 remains one hundred and fifty pounds per square inch higher than that in line 48 up to a limit of one thousand and sixty pounds per square inch. With a propeller underspeed, the pressure in line 50 remains at three hundred pounds per square inch under the control of the valve 52, the pressure in line 48 may fall to fifty pounds per square inch and the pressure in line 20 drops to four hundred and fifty pounds per square inch, that is one hundred and fifty pounds per square inch above the higher of the pressures in lines 48 and 50.

Assuming the actual and selected speeds to be equal, the lands 32 and 34 of the main control valve member 28 partially close the lines 48 and 50, the lands being underlapped to ensure a flow of liquid to the lines, and in the line 50 pressure is maintained at three hundred pounds per square inch by the valve 52. The pressure in the line 50 holds open the hydraulic pitch lock valve 130 and holds open the mechanical pitch lock servo valve 180 to enable liquid under pressure to hold the tooth 168 out of engagement with the ratchet teeth 166.

The centrifugal forces acting on the propeller blades and the pressure in the line 50 tending to move the blades in a decrease pitch direction are opposed by the higher pressure in the increase pitch line 48 and the propeller blade pitch is held hydraulically.

If an underspeed occurs, the blade angle must be reduced and the weights 262 allow the spring 266 to depress the valve member 28 to increase the closure of the line 48 by the land 32. This reduces the pressure in the line 48 until centrifugal forces move the propeller blades to a finer pitch and the speed is corrected. The valves 180 and 130 remain open under the pressure in line 50 so that the mechanical and hydraulic pitch locks remain released.

If an overspeed occurs, the blade angle must be increased and the spring 266 is compressed by the action of the weights 262 to raise the valve member 28 to increase the pressure in line 48 and reduce the pressure in line 50. The remaining pressure in line 50 is sufficient to hold the valves 130 and 180 open and both pitch locks released. Centrifugal forces on the propeller blades and the pressure in line 50 are overcome by the pressure in line 48 so that piston 114 moves and alters the blade angles to a coarser pitch.

When the lever 238 is moved to a position corresponding to the lowest pitch angle acceptable in r.p.m. governing, in this example 23°, the piston 114 assumes the position in which it is prevented from further displacement in the sense to reduce the pitch angle by the stops 216. Movement of the lever 238 to a position in the Beta range has the effect of rotating the cams 240 and 241 and also the blade follow-up member 236. The cam 241 is moved to a position in which the member 83 of the clutch operating valve 68 is allowed to rise, thus allowing the slidable valve member 87 to lift to transfer communication of the line 93 from the 20 to exhaust and allowing the clutch members 253 and 255 to engage and transmit motion from the lever 246 to the member 71 of the valve 69. The cam 240 depreses the valve member 70 placing the port 40 in communication with the chamber 65 of the pressure relief valve 96 by way of line 81 and this additional pressure on the piston 94 has the effect of isolating the chamber 92 from the exhaust port 98 to increase the pressure in the lines 90 and 104 to the high value. This has the effect of lifting the valve member 202 of the stop withdrawal servo valve 200 and allowing liquid at this high pressure to pass through ports 198 and 210 to the line 214 and displace the piston 220 against the spring 222 and the pressure in the line 50, to withdraw the finger 218 and permit the piston 114 to continue its movement in the decrease pitch direction into the Beta range, the stops 216 being cammed out of stopping position by the piston 114 with the fingers 218 withdrawn. The stops 216 are thereafter prevented from returning to their operative position until the piston 114 leaves the Beta range. Rotation of the blade follow-up member 236 causes the roller 234 to ride up the cam surface 232 to rock the lever 246, depress the stem 258 and main control valve member 28 and causes the system to behave as if for an underspeed condition and decrease the pitch of the propellers to that selected by the lever 238.

If the blade angle is to be reduced to smaller positive angles or to be made more negative, the lever 238 is moved to select the new angle desired and thus rotates the member 236. There is a positive difference between the actual and selected blade pitch angles. The roller 234 on the cam surface 232 causes the member 236 to rise and this rocks the lever 246 to depress the stem 258 and main control valve member 28. This causes the system to operate as though an underspeed has occurred and the blade angle is reduced. This reduction causes corresponding rotation of the sleeve 230 so that the member 236 is lowered. This rocks the lever 246 back and the main control valve member reverts to its previous position under the action of the weights 262.

If the blade angle is to be increased towards positive angles or to be increased in positive angle, then there will be a negative difference between the actual and selected blade pitch angles. Movement of the lever 238 to the new position rotates the member 236 causing it to ride down the cam surface 232 and allowing the main control valve member 28 to rise. This causes the system to operate as though an overspeed has occurred and the blade angle is increased. This increase is transmitted through the linkage 224 causing corresponding rotation of the sleeve 230 as the change of actual blade angle is fed back to the blade angle follow-up device. The main control valve member 28 then reverts to its previous position of balance.

Rocking of the members 248 and 251 does not affect the plunger 71 unless the negative difference exceeds 3°.

If the negative difference between the actual and selected blade pitch angles is greater than 3°, for example, in fault conditions, where pressure is applied to the decrease pitch line 50, then the downward movement of the member 236 rocks the lever 246 to lift the plunger 71 out of contact with the piston 94 of the relief valve 96. Pressure in the chamber 65 is relieved through the holes 100 and the pressure in the lines 90 and 104 is now the low pressure which is determined by the strength of the spring 63 acting on the relief valve 96. This is set to give fifty pounds per square inch pressure. This is insufficient to hold up the valve member 148 of the valve 146, which is depressed by its spring to connect the line 140 to the line 104 through the ports 144 and 160. This cuts off decrease pitch line pressure from the hydraulic pitch lock valve 130 and the latter is depressed by its spring to close the by-pass to the non-return valve 124. This prevents further movement of the piston 114 in a decrease pitch direction, but does not prevent movement in an increase pitch direction which is called for by the negative difference between the actual and selected blade pitch angles.

Thus if pressure is available in the increase pitch line 48, the actual blade angle will be increased to eliminate the difference indicated by the blade angle follow-up device. Once the difference has been reduced to below 3°, the spring 75 acts once again on the piston 94 of the valve 96 and the pressure in the line 90 is increased to lift the valve 146 and open the pitch lock valve 130.

If, however, the fault continues and no pressure is available in the increase pitch line 48, no further reduction of pitch can occur, because the pitch lock valve 130 remains closed.

The lever 238 may be arranged to control blade angle throughout the range of operation, and in this case, the clutch 254, valve 68 and cam 241 may be eliminated.

I claim:

1. A control system for the control of the pitch angle of a variable-pitch propeller blade of an aircraft, the system comprising a piston displaceable in a cylinder and operatively connected to control, by the position of the piston, the pitch angle of the propeller blade, a decrease-pitch line communicating with the cylinder on one side of the piston for the supply of working liquid thereto to displace the piston in one direction in the sense to decrease the forward pitch angle and increase the reverse pitch angle of the propeller blade, an increase-pitch line communicating with the cylinder on the other side of the piston for the supply of working liquid under pressure to displace the piston in the direction opposite to said one direction in the sense to decrease the reverse pitch and increase the forward pitch of the propeller blade, mechanical stop means normally defining a limiting displacement of the piston in said one direction, selecting means displaceable through a series of positions to select the desired values of the propeller speed and of the pitch angle of the propeller blade, the selecting means having two successive ranges of positions the first of which corresponds to piston positions displaced from said limiting displacement in the direction opposite to said one direction and the second of which corresponds to piston positions displaced from said limiting displacement in said one direction, a control line arranged for the supply of operating liquid at a pressure which can be varied, first hydraulic-valve means controlled by the pressure in the control line and arranged, when that pressure is less than a first limiting value, to prevent said working liquid from being discharged from the cylinder to the increase-pitch line, second hydraulic-valve means also controlled by the pressure in the control line and arranged, when that pressure exceeds a second limiting value greater than the first limiting value, to render the stop means inoperative, a pressure-setting relief valve connected to said control line and arranged to vary the pressure of the liquid within the control line and to control that pressure to a value intermediate said first and second limiting values when the selecting means is within said first of its two ranges, means operable by the selecting means when within said second of its two ranges to normally cause the relief valve to control the pressure of the liquid within the control line to a value greater than both said first and said second limiting values, a differential device operably connected to said selecting means and the propeller blade when the selecting means is within said second of its two ranges to provide a movement which is a function of the pitch angle error of the propeller blade, a mechanical linkage operably connected between said differential device and said relief valve to cause that valve to control the pressure of the liquid within the control line to a value less than both said first and second limiting values when the departure of the piston position in said one direction from a selected position exceeds a predetermined value, and clutch means operated by the selecting means to disengage the mechanical linkage from the relief valve except when the selecting means is within said second of its two ranges.

2. A control system according to claim 1, which includes a pitch-lock servo valve and a pitch-lock valve both of which form parts of said first hydraulic-valve means, said pitch-lock valve being connected within said increase-pitch line and being normally unoperated to prevent said discharge of said working liquid from said cylinder to said increase-pitch line but being capable of being operated by a pitch-lock liquid pressure to allow said discharge, said servo valve being connected to said pitch-lock valve to control the operation thereof in response to said operating liquid pressure within said control line, whereby, when said operating liquid pressure exceeds said first limiting value, said servo valve becomes operated to connect said decrease-pitch line to said pitch-lock valve to provide said pitch-lock liquid pressure and to operate said pitch-lock valve.

3. A system according to claim 1, which includes a hydraulic clutch-operating valve operatively connected to control the operation of said clutch means, and a first cam connected to respond to said displacement of said selecting means and operatively connected to said clutch-operating valve to thereby control the operation of said clutch means in response to said displacement of said selecting means.

4. A system according to claim 3 wherein said clutch operating valve is connected between a source of liquid under pressure and said clutch means and is arranged to connect said clutch means to said source to disengage the mechanical linkage from the relief valve when said selecting means is within said first of its two ranges, and to disconnect said clutch from said source to connect the mechanical linkage to the relief valve when said selecting means is within said second of its two ranges.

5. A system according to claim 1, wherein said differential device comprises a first rotatable member carrying a roller and connected to said selecting means to assume an angular position corresponding to the setting of that means, a second rotatable member having a cam surface engaged by said roller and connected to said piston to assume an angular position corresponding to the position of said piston, and a pivoted lever operatively connected between said differential device and said mechanical linkage to pivotally move in accordance with the difference between said angular positions of said first and second rotatable members and to transmit said pivotal movement to said mechanical linkage.

6. A system according to claim 5, in which the mechanical linkage comprises a rod which carries one clutch member of the clutch means and which is rotatable according to the pitch angle error of the propeller blade and which is displaceable in the direction of its length, the linkage including a spring arranged to tend to displace the rod in a direction tending to engage the clutch means.

7. A system according to claim 1, wherein the second hydraulic-valve means includes a stop withdrawal servo-valve connected to said control line to be controlled by said operating liquid output pressure therein and operatively connected to control said stop means to render said stop means inoperative when said output pressure exceeds said second limiting value.

8. A system according to claim 7, in which the relief valve includes a first valve member which variably co-operates with a valve seating to provide a variable leakage from a first valve chamber connected to a source of liquid under pressure thereby to vary the pressure of the liquid within the first chamber, the first chamber being connected to the control line.

9. A system according to claim 8, in which the relief valve includes a first spring urging the first valve member towards the seating, the arrangement being such that when the first valve member is subjected only to the action of the first spring, the pressure within the control line is controlled by the relief valve to said value less than both said first and second limiting values.

10. A system according to claim 9, in which the relief valve also includes a second valve member, and a second spring which urges the second valve member into contact with the first valve member, whereby the first valve is urged towards the seating by both the first and the second springs under which condition the pressure within the control line is controlled by the relief valve to said value intermediate said first and second limiting values.

11. A system according to claim 10, in which the relief valve includes a second valve chamber the liquid pressure within which acts upon the first and second valve members to tend to urge the first valve member towards the seating, the system including a main stop withdrawal valve capable of being connected between a supply of liquid under pressure and said second chamber, the withdrawal valve having two positions in one of which said second chamber is connected to exhaust and in the other of which said second chamber is subjected to said supply pressure, the arrangement of the relief valve being such that when said first and second springs and also said supply pressure within the second chamber urge the first valve member towards the seating, the pressure within the control line is controlled by the relief valve to said value greater than both said first and second limiting values.

12. A system according to claim 11, which includes a second cam connected to respond to said displacement of said selecting means and operatively connected to said withdrawal valve thereby cause said withdrawal valve to assume said other of its two positions when said selecting means is within said second of its two ranges.

13. A system according to claim 10, in which the second valve member is connected to the clutch means, the arrangement being such that when the clutch is disengaged it connects the mechanical linkage to the second valve member whereby when said departure of the piston position in said one direction from a selected position exceeds said predetermined value, the mechanical linkage lifts the second valve member out of contact with the first valve member such that the first valve member is subjected only to the action of the first spring.

References Cited by the Examiner

UNITED STATES PATENTS

| | | | |
|---|---|---|---|
| 2,781,856 | 2/57 | Danvers et al. | 170—160.2 X |
| 2,798,563 | 7/57 | Miller et al. | 170—160.21 |
| 2,889,888 | 6/59 | Fairhurst | 170—160.2 |
| 2,980,188 | 4/61 | Allen et al. | 170—160.2 |
| 2,992,687 | 7/61 | Brett et al. | 170—160.21 |
| 3,003,567 | 10/61 | Flaugh et al. | 170—160.2 X |
| 3,024,848 | 3/62 | Chilman et al. | 170—160.32 |
| 3,037,560 | 6/62 | Pond | 170—160.21 |
| 3,073,547 | 1/63 | Fischer | 170—160.2 X |
| 3,080,928 | 3/63 | Godden et al. | 170—160.32 |

SAMUEL LEVINE, *Primary Examiner.*

ABRAM BLUM, JULIUS E. WEST, *Examiners.*